Aug. 26, 1952   J. G. SMITH   2,608,019
ANIMAL TRAP
Filed April 23, 1951
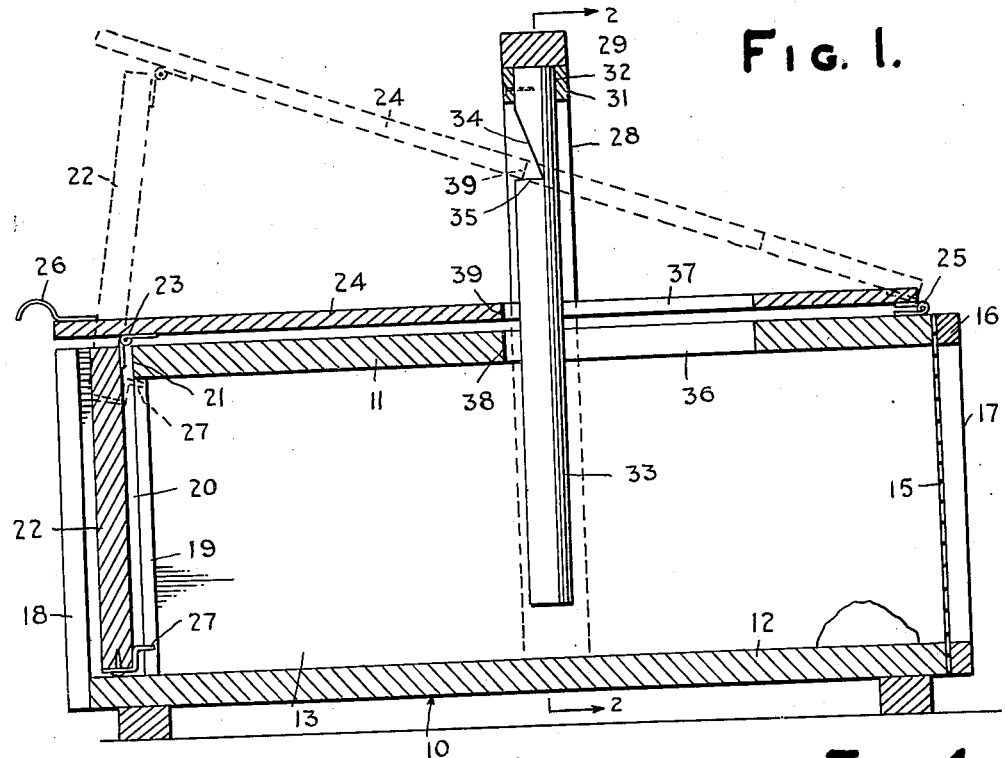
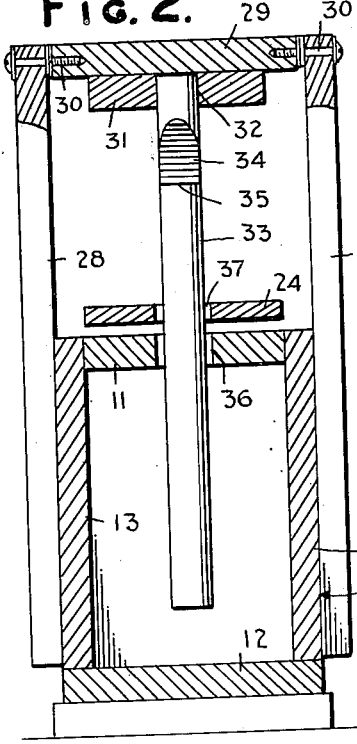
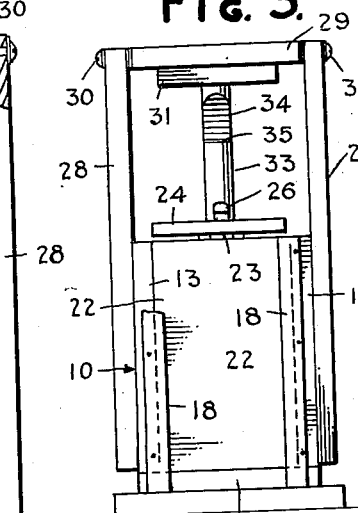
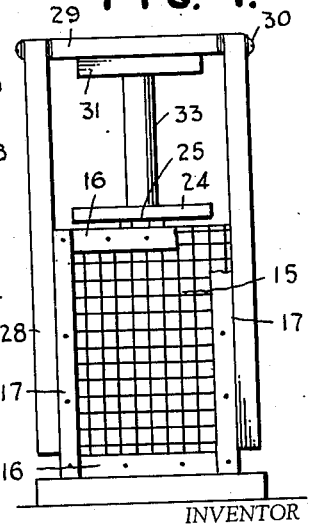
INVENTOR
J. G. SMITH
BY *[signature]*
ATTORNEY Patented Aug. 26, 1952

2,608,019

UNITED STATES PATENT OFFICE 2,608,019

ANIMAL TRAP

John G. Smith, Bethesda, Md.

Application April 23, 1951, Serial No. 222,415

1 Claim. (Cl. 43—61)

My invention relates to a trap for small animals.

A primary object of the invention is to provide a small animal trap of the class generally known as box traps, which is highly simplified in construction and operation, strong and durable and inexpensive to manufacture.

A further object is to provide a trap of the above-mentioned character having novel and simplified setting and release means which may also serve as a convenient handle for carrying the trap.

A further object is to provide a box trap for small animals which will securely confine the animal without injuring it, the trap employing no springs, snapping jaws or the like in its mechanism.

A still further object of the invention is to provide a trap of the above-mentioned character which is very easy to set, and reliable and efficient in operation.

Other objects and advantages of the invention will be apparent during the course of the following description.

In the accompanying drawings, forming a part of this application, and in which like numerals are employed to designate like parts throughout the same, Fig. 1 is a central vertical longitudinal section through the trap embodying the invention, parts being shown in dotted lines positioned for setting the trap, Figure 2 is a transverse vertical section taken on line 2—2 of Figure 1, Figure 3 is a front end elevation of the trap, and Figure 4 is a rear end elevation of the same.

In the drawings, where for the purpose of illustration is shown a preferred embodiment of my invention, the numeral 10 designates generally an elongated rectangular box or body portion, including a horizontal top 11, bottom 12 and longitudinal vertical sides 13 and 14. The front end of the box 10 is open, and its rear end is closed by a wire screen 15, or the like, secured in place by marginal strips 16 and 17, nailed or otherwise rigidly secured to the rear end of the box 10.

A first pair of vertical guides or rails 18 are rigidly secured to the forward ends of the vertical sides 13 and 14, and have their inner vertical edges projecting laterally inwardly of the inner faces of the sides 13 and 14, Figure 3. A second pair of laterally opposed vertical guides or rails 19 are rigidly secured to the inner faces of the sides 13 and 14, and spaced rearwardly of the guides 18, Figure 1, so that vertical channels or passages 20 are formed between the pairs of guides 18 and 19. The forward end 21 of the top 11 terminates flush with the forward edges of the vertical guides 18, as shown, to provide a transverse opening at the top of the box for receiving a vertically movable trap door 22.

The trap door 22 is mounted to slide freely between the sides 13 and 14, and between the pairs of guides 18 and 19. The trap door has its upper end connected by a hinge 23 with a vertically swingable drop plate or lever 24, disposed above the top 11 and extending longitudinally thereof for substantially the entire length of the box 10. The lever 24 has its rear end hinged at 25 to the rear end of the top 11, and the lever 24 is equipped at its forward end with a handle 26 to facilitate raising the lever when the trap is set. The trap door 22 has a stop element 27 rigidly secured to its bottom end and projecting rearwardly for engagement with the under side of the top 11, to limit the upward movement of the trap door. The vertical passages 20 are sufficiently wide to permit the trap door 22 to move from its raised to its lowered positions without binding, and the hinge 23 allows the trap door to change its angle with relation to the lever 24, as required.

Rigidly secured to the sides 13 and 14, near the longitudinal center of the box 10 are a pair of laterally opposed vertical arms or posts 28, preferably extending from the bottom of the box 10 to points a substantial distance above its top 11, as shown. A horizontal transverse cross piece or bar 29 extends between the upper ends of the posts 28 and is journaled thereon for free rotation by means of pins 30 or the like. The cross piece 29 may carry a block 31, rigidly secured to its lower side and having an opening or socket 32 at its longitudinal center, and midway between the posts 28. The opening 32 receives the upper end of a vertically swingable bar or trigger 33, rigidly anchored therein, and provided in its forward side and near its top with a notch 34, forming a horizontal shoulder 35. The trigger 33 is freely swingable within longitudinal slots 36 and 37, formed in the top 11 and lever 24 respectively. The lower end of the trigger 33 terminates near and above the bottom 12, as shown, and the trigger is quite long, and heavy enough to readily assume a vertical position due to gravity, whenever it is pivoted about the pins 30.

The longitudinal slots 36 and 37 extend rearwardly from points near the longitudinal center of the top 11, and have their rear ends terminating forwardly of the rear end of the box, as shown. The slots 36 and 37 are long enough to permit adequate swinging of the bar or trigger 33, when the same is engaged and pushed rearwardly by the animal entering the trap. The forward end 38 of the slot 36 limits the forward swinging movement of the trigger 33, and the trigger will normally assume a vertical position by gravity.

When the trap is to be set, the handle 26 is grasped for elevating the trap door 22 and lever 24. The forward end 39 of the slot 37 enters the notch 34 of the trigger and the lever 24 engages and rests upon the horizontal shoulder 35, to assume the inclined position shown dotted in Figure 1. When setting the trap, it is merely necessary to raise the lever 24 and it will automatically become locked in the elevated position by the trigger 33, because the trigger will return by gravity to the vertical position after being momentarily displaced by the upward movement of the lever 24. With this arrangement, no springs or separate latch elements are required for releasably connecting the trigger 33 and lever 24 to set the trap. The trigger 33 is long enough so that a very slight pressure against the same near its lower end by the animal will disengage the shoulder 35 from the lever 24 and spring the trap.

Since the lever 24 is hinged to the top 11 at its extreme rear end, when the trap is sprung, the full effect of gravity is utilized for closing the trap door rapidly. The bait is placed near the rear end of the box 10, close to the screen 15 and the trap is set. The animal enters the forward end of the box and passes rearwardly therein to reach the bait. As soon as the animal engages the trigger 33 and shifts it rearwardly slightly, the shoulder 35 disengages the lever 24 and the trap is sprung.

Particular attention is directed to the fact that the cross piece 29 also functions as a convenient handle for carrying the trap. The cross piece is arranged near the longitudinal center of the box and near the center of balance. This construction enables the long trigger 33 to be extremely sensitive, and also renders the trap easy to carry about.

It is to be understood that the form of the invention herewith shown and described is to be taken as a preferred example of the same, and that various changes in shape, size and arrangement of parts may be resorted to, without departing from the spirit of the invention or the scope of the subjoining claim.

Having thus described my invention, I claim:

An animal trap comprising a box including sides and a top, said box having one end open and said top having an opening formed therein between its ends, a lever having generally the same length as the top and arranged above the top, means permanently pivotally connecting one end of the lever with the corresponding end of the top, said lever having an opening formed therein, a vertically movable trap door to cover and uncover the end opening of the box and terminating adjacent to the top of the box when the trap door is closed, said lever extending adjacent to the door, means for permanently pivotally connecting said lever and the top of the door, the lever being arranged close to said top and substantially parallel with said top when the door is closed, a pair of substantially vertical posts arranged near the longitudinal center of the box and secured to the sides and projecting above the top of the box for a substantial distance, a substantially horizontal cross bar extending between the posts and pivotally connected therewith to turn upon its longitudinal axis, said cross bar serving as a handle, and a long trigger bar extending through the openings in the top and lever and permanently connected with the cross bar, said trigger bar being provided near its upper end with a notch forming a shoulder to engage beneath said lever, the arrangement being such that the trigger bar gravitates to a vertical position when released to automatically lock with said lever when the lever is moved to the raised position.

JOHN G. SMITH.

REFERENCES CITED

The following references are of record in the file of this patent:

UNITED STATES PATENTS

| Number | Name | Date |
|---|---|---|
| 107,647 | Bachman | Sept. 27, 1870 |
| 253,907 | Andre | Feb. 21, 1882 |
| 1,382,416 | Dresser | June 21, 1921 |
| 1,387,803 | Palahnuk | Aug. 16, 1921 |
| 1,466,602 | Savicks | Aug. 28, 1923 |
| 1,650,455 | Lewis | Nov. 22, 1927 |
| 2,541,681 | Andrews | Feb. 13, 1951 |

FOREIGN PATENTS

| Number | Country | Date |
|---|---|---|
| 78,494 | Germany | Dec. 13, 1894 |